UNITED STATES PATENT OFFICE.

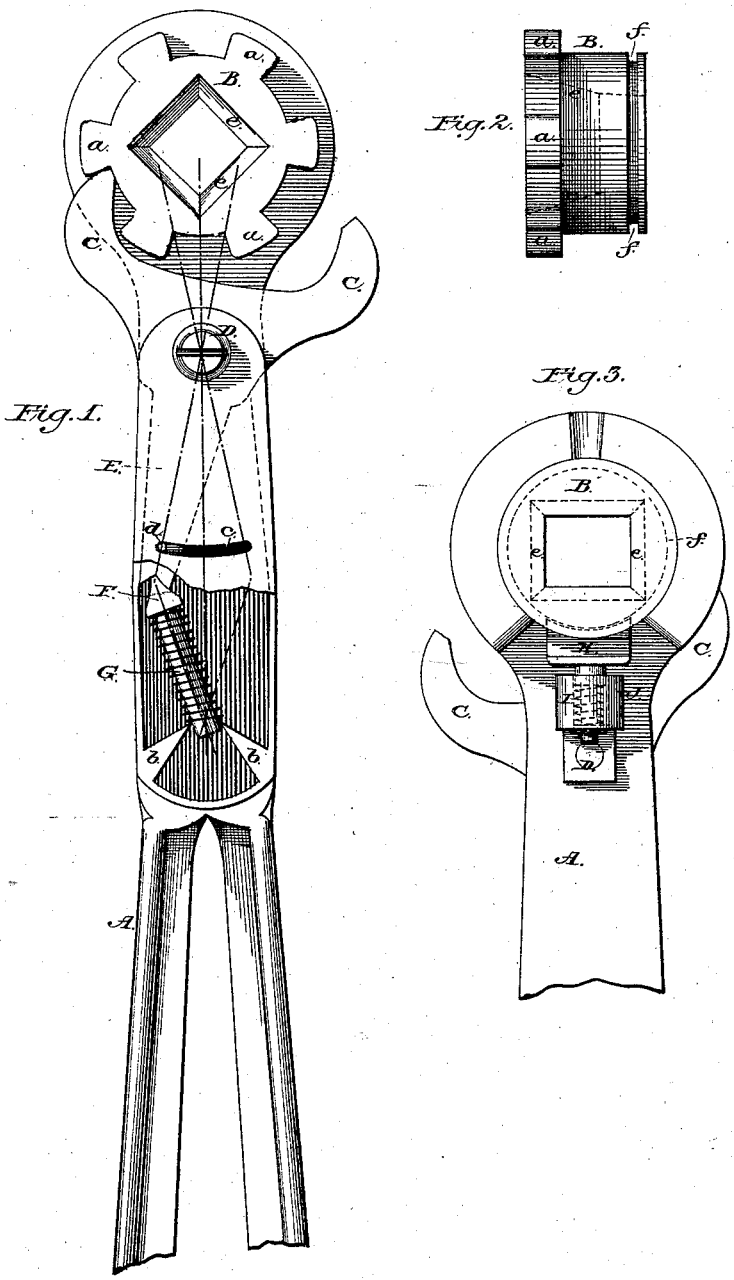

GURDON S. GOODSPEED, OF PROVIDENCE, RHODE ISLAND.

IMPROVEMENT IN WRENCHES.

Specification forming part of Letters Patent No. 203,262, dated May 7, 1878; application filed August 8, 1877.

*To all whom it may concern:*

Be it known that I, GURDON S. GOODSPEED, of the city and county of Providence, in the State of Rhode Island, have invented a new Improvement in Wrenches; and I declare the following to be a specification thereof, reference being had to the accompanying drawings.

Like letters indicate like parts.

Figure 1 is a front elevation of my invention. Fig. 2 shows the nut-holder separately. Fig. 3 is a rear elevation of my invention.

The handle A, at its end, has a circular opening, within which loosely fits and turns the circular nut-holder B. On or near the circumference of the nut-holder is a series of cogs, $a\ a$, preferably of the pentagonal shape shown in Fig. 1, which furnish a bearing for or engage with the pawl C. The pawl C is in the shape of a pallet and turns upon its pivot D. It terminates with a stem, E, the end of which has a slight indentation. A dog, F, with a sharp or barbed point, bears against the end of the stem E. It is surrounded with the spiral spring G, which crowds it against the stem E. The spring has its bearings against the barb on one side, and on the other against the shoulders $b$ on the handle A. The stem E, dog F, and spring G are all contained and operate within a hollow case or box in the handle A. A slot, $c$, is made in the cover of the box, through which projects the pin $d$ of the stem E, by moving which pin the pawl may be adjusted from one side to the other.

The nut-holder has the usual angular opening for the reception of the nut or bolt, except that it is capable of seizing nuts of different sizes by means of its beveled interior faces $e$. On its rear end it is grooved circumferentially, as shown at $f$. The purpose of this groove is to receive the catch H. (See Fig. 3.) The end of this catch is concaved to fit upon the nut-holder within the groove, and bears against it by means of the spiral or other spring I within the socket J. By withdrawing the catch it is disengaged from the groove of the nut-holder, and the latter may be removed and another nut-holder of a different capacity may be substituted for it in position.

The adjustment of the pallet-shaped pawl may easily be effected by other devices than by a spiral or other spring—as, for example, by an eccentric-cam or an external stem, E, to be operated by hand, or a single pawl upon a spindle and reversed by a half-revolution. Such devices, however, are obviously within my invention.

So also it would be but a modification of my invention and, essentially, a mere mechanical equivalent, if, instead of a detachable, rotary nut-holder, B, to turn a bolt, the head of the bolt itself be provided with cogs $a$, and be turned by a pawl, substantially as described. By such adaptation my invention is applicable to a variety of uses—as, for example, a jack-screw.

I claim as a useful and novel invention and desire to secure by Letters Patent—

The combination of the handle A, rotating cogged and grooved nut-holder B, double pawl C, pivot D, stem E, dog F, springs G and I, and catch H, arranged and operating substantially as described.

GURDON S. GOODSPEED.

Witnesses:
WM. B. W. HALLETT.
NELSON E. CHURCH.